US008811040B2

(12) United States Patent
Halberstadt et al.

(10) Patent No.: US 8,811,040 B2
(45) Date of Patent: Aug. 19, 2014

(54) CIRCUIT FOR A RESONANT CONVERTER

(75) Inventors: Hans Halberstadt, Groesbeek (NL);
Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 305 days.

(21) Appl. No.: 13/299,617

(22) Filed: Nov. 18, 2011

(65) Prior Publication Data

US 2012/0127761 A1    May 24, 2012

(30) Foreign Application Priority Data

Nov. 24, 2010    (EP) .................................... 10251997

(51) Int. Cl.
*H02M 3/335*    (2006.01)
(52) U.S. Cl.
USPC ............................ 363/21.02; 363/16; 323/282
(58) Field of Classification Search
USPC ......... 363/17–20, 21.02, 21.11, 21.18, 21.13, 363/89; 323/282–290, 351
See application file for complete search history.

(56) References Cited

U.S. PATENT DOCUMENTS

| | | | |
|---|---|---|---|
| 6,018,467 A | 1/2000 | Majid et al. | |
| 7,269,749 B2 * | 9/2007 | Zee ................. | 713/320 |
| 7,622,904 B2 | 11/2009 | Sutardja et al. | |
| 7,679,938 B2 * | 3/2010 | Ye et al. ....................... | 363/21.12 |
| 7,830,130 B2 * | 11/2010 | Jacques et al. ................ | 323/282 |
| 8,014,176 B2 * | 9/2011 | Melanson et al. ......... | 363/21.02 |
| 8,031,489 B2 * | 10/2011 | Wang et al. ................ | 363/21.06 |
| 8,174,851 B2 * | 5/2012 | Elferich ..................... | 363/21.02 |
| 8,279,628 B2 * | 10/2012 | Melanson ....................... | 363/17 |
| 2008/0043504 A1 | 2/2008 | Ye et al. | |
| 2008/0130324 A1 | 6/2008 | Choi et al. | |
| 2008/0175029 A1 | 7/2008 | Jung et al. | |
| 2009/0244934 A1 | 10/2009 | Wang et al. | |

FOREIGN PATENT DOCUMENTS

| | | |
|---|---|---|
| CN | 1639659 A | 7/2005 |
| CN | 101056052 A | 10/2007 |
| CN | 101577494 A | 11/2009 |
| WO | 2010/020909 A1 | 2/2010 |

OTHER PUBLICATIONS

Choi, H.-S et al. "Techniques to Minimize Power Consumption of SMPS in Standby Mode", Power Electronics Specialists Conf. IEEE, pp. 2817-2822 (Jan. 1, 2005).
"Reference Design: High Performance, L6599-based HB-LLC Adapter with PFC for Laptop Computers", ST, 29 pgs., retrieved from the internet at: www.st.com/internet/com/TECHNICAL.../CD00095079.pdf (2006).
Extended European Search Report for Patent Appln. No. 10251997.2 (Aug. 25, 2011).
NXP; "AN10907, TEA 1613T Resonant Power Supply Control IC—Rev 1"; 82 pages (Dec. 28, 2010).
CN Office Action dated Nov. 25, 2013.

* cited by examiner

*Primary Examiner* — Rajnikant Patel

(57) ABSTRACT

A circuit (1202) for a resonant converter (1204; 1326), the resonant converter configured to operate in a burst mode of operation, the circuit configured to:
receive a signal (1206; 1308) representative of the output of the resonant converter;
compare the received signal (1206; 1308) representative of the output of the resonant converter with a reference signal (1208; 1304) in order to provide an error signal (1310); and
process the error signal (1310) in order to provide a control signal (1210; 1328), wherein the control signal (1210; 1328) is configured to set the switching frequency of the resonant converter in order to control the output power during the on-time of a burst of the resonant converter.

15 Claims, 17 Drawing Sheets

CIRCUIT FOR A RESONANT CONVERTER

CROSS-REFERENCE TO RELATED APPLICATIONS

This application claims the priority under 35 U.S.C. §119 of European patent application no. 10251997.2, filed on Nov. 24, 2010, the contents of which are incorporated by reference herein.

The present disclosure relates to the field of circuits for resonant converters, and particularly, although not exclusively, circuits that have a controller that is configured to measure an output voltage of the switching circuit.

Resonant converters are becoming increasingly popular as they can provide high efficiency at moderate to high loads, amongst other things. An LLC converter is a resonant converter topology that is often used for converters with a fixed DC voltage output. A basic diagram of an LLC converter is provided as FIG. 1, and is described below.

The listing or discussion of a prior-published document or any background in the specification should not necessarily be taken as an acknowledgement that the document or background is part of the state of the art or is common general knowledge.

According to a first aspect of the invention, there is provided a circuit for a resonant converter, the resonant converter configured to operate in a burst mode of operation, the circuit configured to:

receive a signal representative of the output of the resonant converter;

compare the received signal representative of the output of the resonant converter with a reference signal in order to provide an error signal; and process the error signal in order to provide a control signal, wherein the control signal is configured to set the switching frequency of the resonant converter in order to control the output power during the on-time of a burst of the resonant converter.

The circuit can improve the efficiency of the resonant converter as the feedback that is provided by comparing the received signal representative of the output of the resonant converter with the reference signal enables the output power during a burst of the resonant converter to be controlled. This is in contrast to the prior art where a fixed switching frequency is used, and therefore the output power is deliberately set at a high value to include a "buffer" to account for any deficiency in the output power due to component tolerances, for example. Embodiments of the invention can enable the "buffer" that is provided by the prior art to be reduced, or eliminated, thereby improving the efficiency of the resonant converter as less energy is wasted.

It will be appreciated that "setting" the switching frequency can include adjusting the switching frequency, or maintaining the switching frequency if adjustment is not required.

The received signal representative of the output of the resonant converter can be representative of the output power, current or voltage of the resonant converter, the required output parameter of the resonant converter, or any other parameter that can be compared with a reference signal in order to determine an error in the output. The received signal can be directly or indirectly representative of the output of the resonant converter. For example, one embodiment of a signal that is indirectly representative of the output of the resonant converter is a signal from an opto-coupler, which is known to provide feedback to a primary side of a transformer from a secondary side of the transformer whilst maintaining galvanic isolation between the two sides of the transformer.

The control signal may be configured to adjust the switching frequency during a burst. In this way, the switching frequency can be dynamically adjusted during a burst such that unnecessary output power can be reduced, and therefore the efficiency of the resonant converter can be improved.

The circuit may be configured to process error signals relating to one or more earlier bursts of the resonant converter in order to provide the control signal. This can enable the control signal to more accurately control the switching frequency as any short-term variations in the error signal will have a reduced effect on the output of the resonant converter.

The circuit may be configured to process error signals that relate to bursts, or predominantly relate to bursts, of the resonant converter in order to provide the control signal. The circuit may not process error signals that relate to "burst off" times, or predominantly relate to "burst off" times, of the resonant converter in order to provide the control signal. This can reduce negative effects that would be caused by using error signals that relate to burst-off times when determining the control signal. For example, a negative effect may be that the control signal would drop down to zero in between bursts, and therefore there would be a period of time at the start of a burst when the control signal would be inaccurate as it changes from zero.

The circuit may be configured to process a value for the control signal or error signal from a previous burst in order to provide a control signal for a current burst. The value for the control signal or error signal from a previous burst may be the last value from a previous burst. In this way, seamless processing can be performed between successive bursts as the processing for a current burst can be started from the processing for a previous (possibly the immediately preceding) burst.

The circuit may comprise a memory component configured to store the last (or any previous) value for the control signal or error signal from a previous burst for use in providing a starting value of the control signal for a current burst.

The circuit may further comprise:

a transient correction component configured to provide a transient correction signal that is configured to reduce any transient effects in the output power of the resonant converter during a burst; and a summation component that is configured to add the transient correction signal to the control signal in order to provide a corrected control signal for setting the switching frequency of the resonant converter.

Use of such a transient correction component can further improve the efficiency of the resonant converter as variations in the output power during a burst can be economically accounted for. Such variations may be systematic such as the peak in the output power at the start of a burst and the reduction in output power at the end of a burst.

The transient correction signal can be particularly advantageous for variations in the output power that will occur for every (or most) burst. This is because the transient correction signal can be a function of time that is fixed in relation to a burst cycle, and therefore feedback may not be required to set parameters of the transient correction signal. In this, a technically uncomplicated method of improving the efficiency of the resonant converter can be provided.

The transient correction signal may comprise a negative peak at the start of a burst and/or a positive peak at the end of a burst in order to reduce an excess in output power at the start of a burst and/or reduce a deficiency in output power at the end of a burst.

The transient correction signal may be configured to change value from the negative and/or positive peak towards zero during the burst. The transient correction signal may be configured to exponentially change value from the negative peak towards zero during the burst and/or exponentially change value from zero towards the positive peak during the burst.

In some examples, the transient correction signal may be a dynamically adjustable function of time, such that feedback representative of the output of the resonant converter is usable by the circuit to determine and apply a suitable transient correction signal.

The circuit may comprise a summation component configured to determine a difference between the received signal representative of the output of the resonant converter (such as the output power) and the reference signal (such as a reference power) in order to provide the error signal.

The circuit may comprise a burst level setting component that is configured to receive the error signal and a "mode of operation" signal, and provide the control signal only when the "mode of operation" signal is representative of a burst mode of operation.

The burst level setting component can open a feedback loop at times between bursts so that the control signal is only updated with error signals received during a burst.

The circuit may be further configured to:
receive a second error signal (for example from an optocoupler) representative of a difference between the output voltage (Vout) of the resonant converter and a reference voltage signal (Vref_out), and provide the "mode of operation" signal in accordance with the second error signal.

The resonant converter may be an LLC converter, although other types of resonant converters are within the scope of the invention. The resonant converters may have two or more reactive elements. The resonant converter may be a basic LC converter. The LC converter may be a series converter (wherein the load is connected in series with the resonant tank), or a parallel converter (wherein the load is connected in parallel two one of the resonant elements). Three element converters (of which the LLC and the LCC are two examples), which can be known as series-parallel resonant converters, can also be used. It will be appreciated that a higher order converter can also be used.

There may be provided a controller for a resonant converter comprising any circuit disclosed herein. There may be provided a resonant converter comprising any circuit disclosed herein. There may be provided an integrated circuit (IC) comprising any circuit disclosed herein.

According to a further aspect of the invention, there is provided a method of providing a control signal for a resonant converter, the resonant converter configured to operate in a burst mode of operation, the method comprising:
receiving a signal representative of the output of the resonant converter:
comparing the received signal representative of the output of the resonant converter with a reference signal in order to provide an error signal; and
processing the error signal in order to provide the control signal, wherein the control signal is configured to set the switching frequency of the resonant converter in order to control the output power for a burst of the resonant converter.

There may be provided a computer program, which when run on a computer, causes the computer to configure any apparatus, including a circuit, controller, resonant converter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

A description is now given, by way of example only, with reference to the accompanying drawings, in which.

Embodiments of the invention relate to a circuit for a resonant converter that is configured to provide a control signal for operating the switches of the resonant converter in a more efficient way than is possible with the prior art. The improvement in efficiency can be achieved by using a feedback loop to adjust the switching frequency, and therefore control the output power during the on-time of a burst, so that the switching frequency is tailored to the actual operating conditions and component values that are in use. This is in contrast to the prior art whereby a high switching frequency during a burst on time must be chosen to ensure that the tolerance in component values does not cause the trip/changeover point between normal operation and burst mode operation to be at a too high a power level for worst case component values. The prior art therefore causes unnecessary low power to be provided to the output of the resonant converter, and therefore gives a relatively low efficiency due to the magnetizing current.

Further improvements in the efficiency of the resonant converter can be achieved by using feedback from one or more earlier bursts when providing a control signal to a current burst and applying a transient correction signal to the control signal during a burst.

Figure 1:
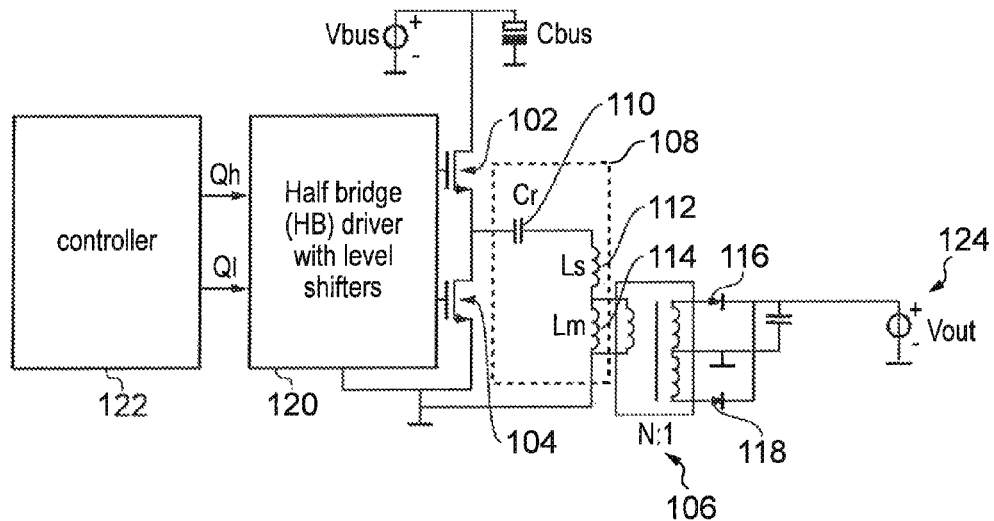
FIG. 1 illustrates a basic diagram of a prior art LLC converter.

A basic diagram of an LLC converter is provided as FIG. 1. The LLC converter includes a resonant tank 108 including a capacitor 110, a first inductor Ls 112 and a second inductor Lm 114 in series. One end of the resonant tank 108 is connected to a junction between two half bridge switches 102, 104, and the other end of the resonant tank 108 is connected to ground. The two half bridge switches 102, 104 are operated by a half bridge (HB) driver with level shifters 120, which in turn is controlled by a controller 122. As is known in the art, the power can be controlled by varying the switching frequency of the half bridge switches 102, 104.

The magnetizing inductance of the transformer 106 is illustrated as an inductor Lm 114. The transformer 106 can also be used such that the first inductor Ls (112) is provided by the transformer, and represents the leakage inductance due to the non ideal coupling between the primary and secondary windings of the transformer 106. The transformer 106 has two secondary windings that are each coupled by a diode 116, 118 to the output 124 of the converter.

Figure 2:
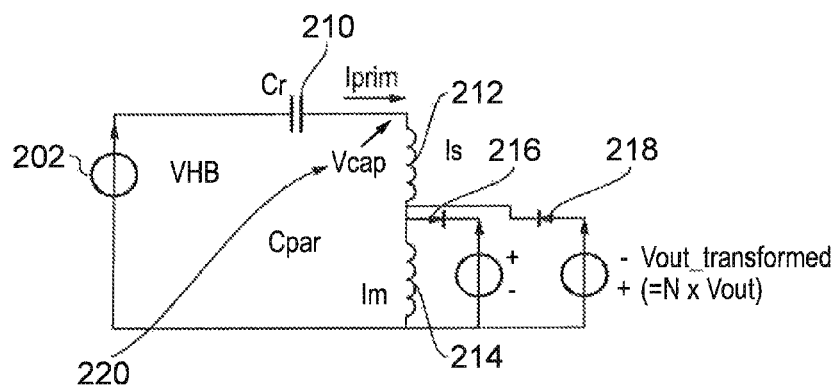
FIGS. 2 to 4 illustrate a simplification of the circuit of FIG. 1.
Figure 3:
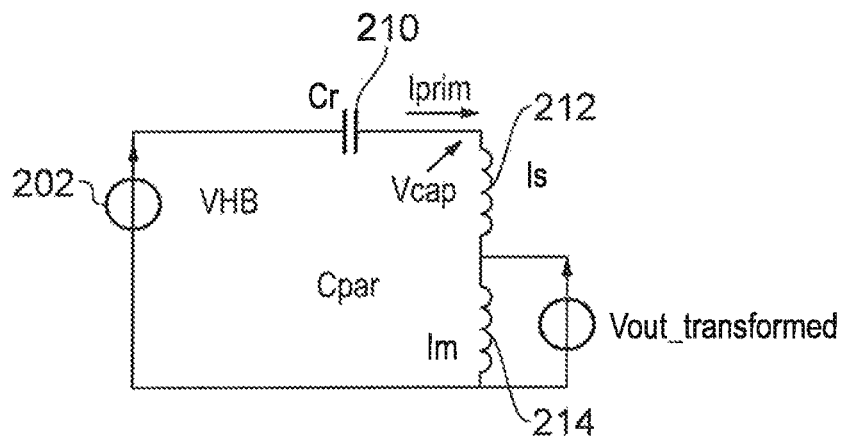
Figure 4:
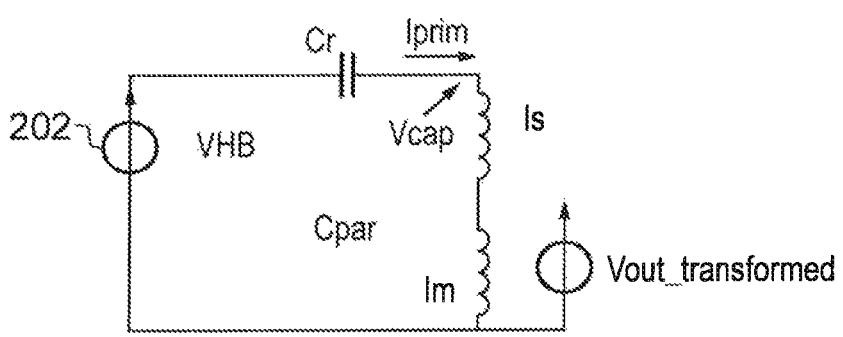

In order to describe the basic operation of an LLC converter, reference is made to FIGS. 2 to 4 that illustrate a simplification of the circuit of FIG. 1. FIG. 2 illustrates the complete circuit, and FIGS. 3 and 4 illustrate only those components that are active during different modes of operation.

VHB 202 is a square wave voltage and represents the voltage at the output of the half bridge switches 102, 104 of FIG. 1. In normal operation, a positive voltage occurs at the node between the first and second inductors 112, 114 during the interval that VHB 202 equals Vbus, while a negative voltage occurs at the node between the first and second inductors 112, 114 during the interval that Vhb equals zero.

The voltage across the primary winding of the transformer 106 is transformed to the secondary side of the transformer 106 by multiplying it with the turns ratio N of the transformer 106, and splitting the voltage between the two secondary windings of the transformer 106. The two diodes 116; 216, 118; 218 at the secondary side of the transformer 106 will not be conducting at the same time.

During normal operation, the converter operates in a so called 50% duty cycle mode, where VHB 202 is more or less a square wave voltage between V=0 and V=Vbus with a dutycycle of 50%. During each half cycle of this 50% duty cycle signal, two important modes can be distinguished as shown in FIGS. 3 and 4.

FIG. 3 shows the mode of operation where one of the diodes at the secondary side of the transformer (diodes 216 and 218 in FIG. 2) conducts during the corresponding halfcycle. This means that the second inductor Lm 214 of the resonant tank is short-circuited. In this mode of operation, the capacitor Cr 210 and the first inductor Ls 212 provide a resonant circuit, giving a part of a sinusoidal period with relatively high frequency. During this interval, a fixed voltage Vout_transformed is present across the second inductor Lm 214, which gives rise to a linearly increasing current through the second inductor Lm 214 and an energy build up in the magnetizing inductance.

FIG. 4 shows the mode of operation where the secondary diodes are reverse biased, and therefore not conducting, during the corresponding halfcycle. In this mode of operation, the second inductor Lm 214 is not short circuited, and therefore the resonant circuit consists of the capacitor Cr 210 and both the first and second inductors Ls, Lm in series. Due to the much larger inductance, the resonant tank has a lower resonant frequency.

The diode at the secondary side of the transformer turns on or off when the current through the capacitor Cr 210 and the first inductor Ls 212 equals the current through the second inductor Lm 214.

Figure 5:
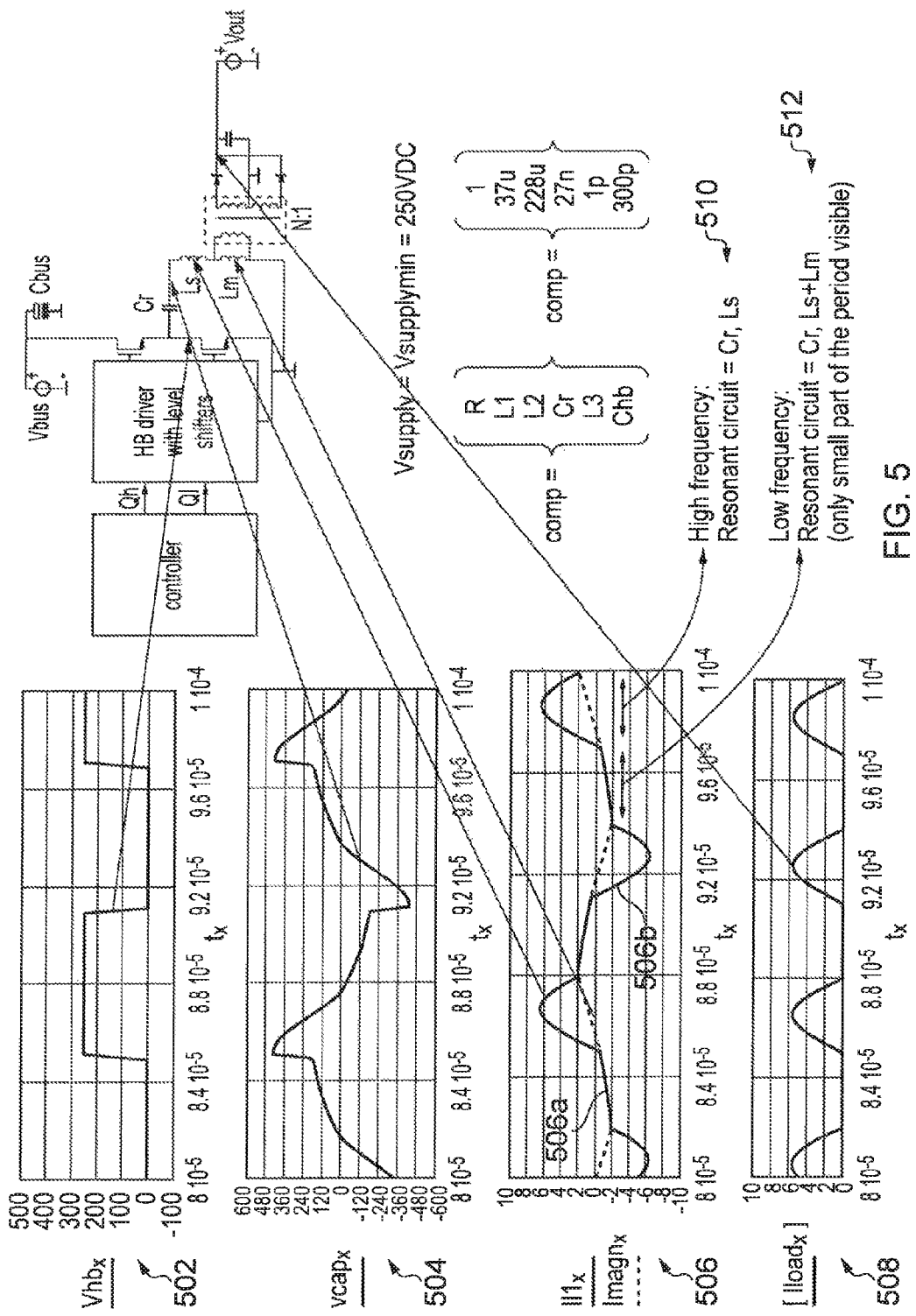
FIG. 5 illustrates graphically some of the signals at nodes in the circuit of FIG. 1.

FIG. 5 illustrates graphically some of the signals at nodes in the circuit of FIG. 1.

The first graph 502 of FIG. 5 shows the voltage at the junction between the two half bridge switches 102, 104, and is a square wave that alternates between the value of Vbus and zero with a 50% duty cycle.

The voltage at the junction between the capacitor Cr 210 and the first inductor Ls 212 is referred to as Vcap 220, and is shown as the second graph 504 in FIG. 5. When the diode at the secondary side of the transformer is off (as shown in FIG. 4), the division of Vcap 220; 504 between the first and second inductors Ls, Lm 112, 114 determines the voltage at the junction between the first and second inductors Ls, Lm 112, 114.

The high frequency and low frequency oscillations in the primary current can be seen in the third graph 506 of FIG. 5. During the high frequency interval, which is identified with reference 510 in FIG. 5, the magnetizing inductance is connected to the reflected outputvoltage, giving a linear increase in the current through the magnetizing inductance.

The current through the magnetizing inductance is shown with reference 506a in FIG. 5.

The fourth graph 508 in FIG. 5 shows the current at the load.

Figure 6:
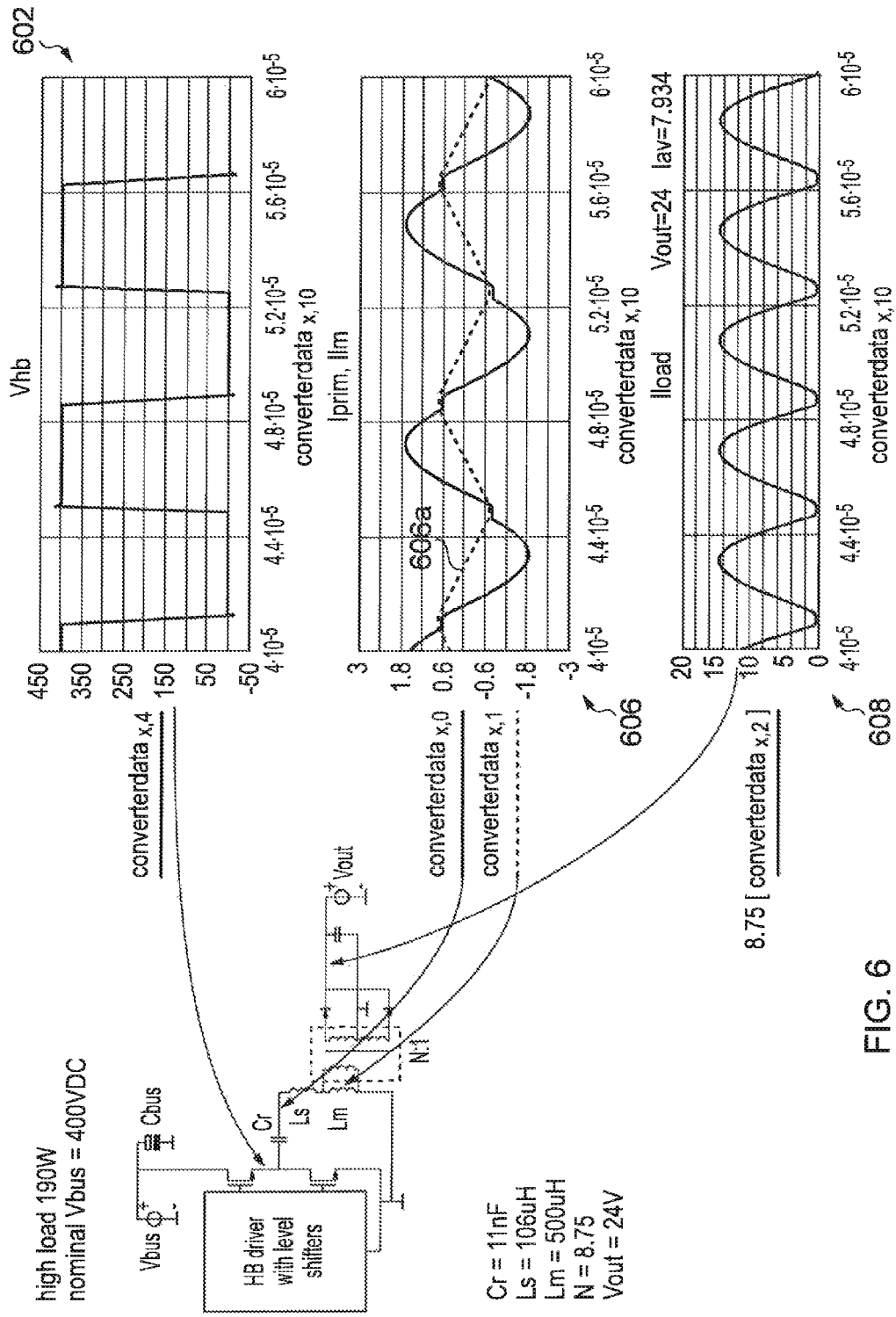
FIGS. 6 and 7 illustrate the operation of the circuit of FIG. 1 with a high load and low load respectively.
Figure 7:
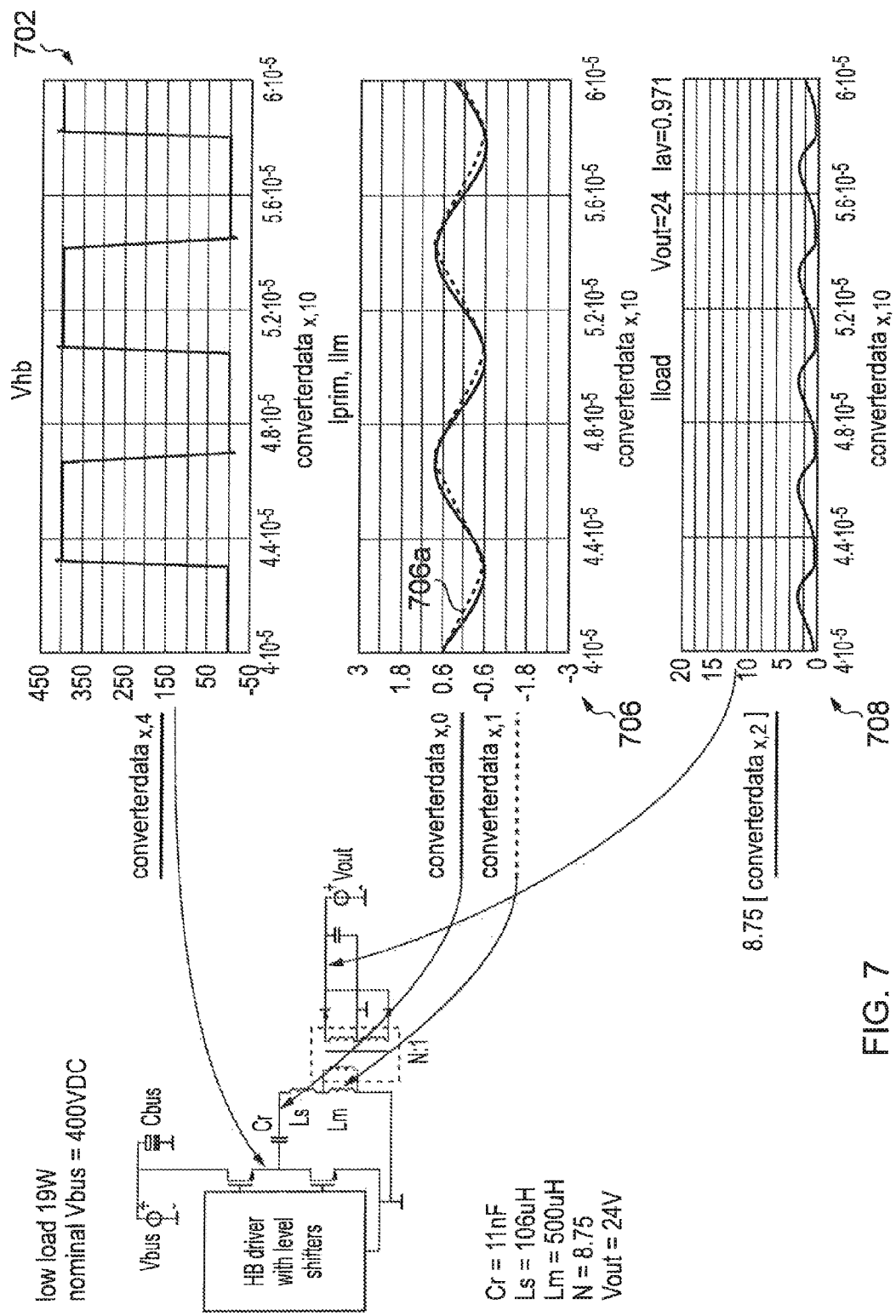

FIGS. 6 and 7 illustrate the operation of the circuit of FIG. 1 with a high load and low load respectively, using the 50% duty cycle mode. FIGS. 6 and 7 illustrate graphically the following signals at nodes in the circuit of FIG. 1: the first graphs 602; 702 of FIGS. 6 and 7 show the voltage at the junction between the two half bridge switches 102, 104; the second graphs 606; 706 show the high frequency and low frequency oscillations in the primary current; and the third graphs 608; 708 show the current at the load. The graphs of FIGS. 6 and 7 correspond to the first, third and fourth graphs of FIG. 5.

It can be seen that from FIGS. 6 and 7 that the amplitude of the magnetizing current 606a; 706a is almost independent of the load, and is substantially the same for a high load of 190 W and a low load of 19 W. This is because the period of the high frequency oscillation is almost constant, while during this period, the rate of change in current through the magnetizing inductance is constant (which can be considered as a fixed di/dt) as a voltage Vout is present across it. One important result from this almost constant magnetizing current is that the losses in the core are also relatively constant for different loads. A rough estimate of these core losses is approximately 0.5-1% of the full load output power. At low loads, this can cause a dramatic drop in the efficiency of the converter as the core losses can represent a high proportion of the output power.

A known method of increasing the efficiency of the converter at low load is to let the converter operate at a relatively high power level during a short interval, and keep the converter fully off in at other times. This is known as a burst mode of operation. In this way, an acceptable ratio between converted power and magnetizing losses can be achieved. The converter can be turned off fully by switching both half bridge switches off at the same time.

Figure 8:
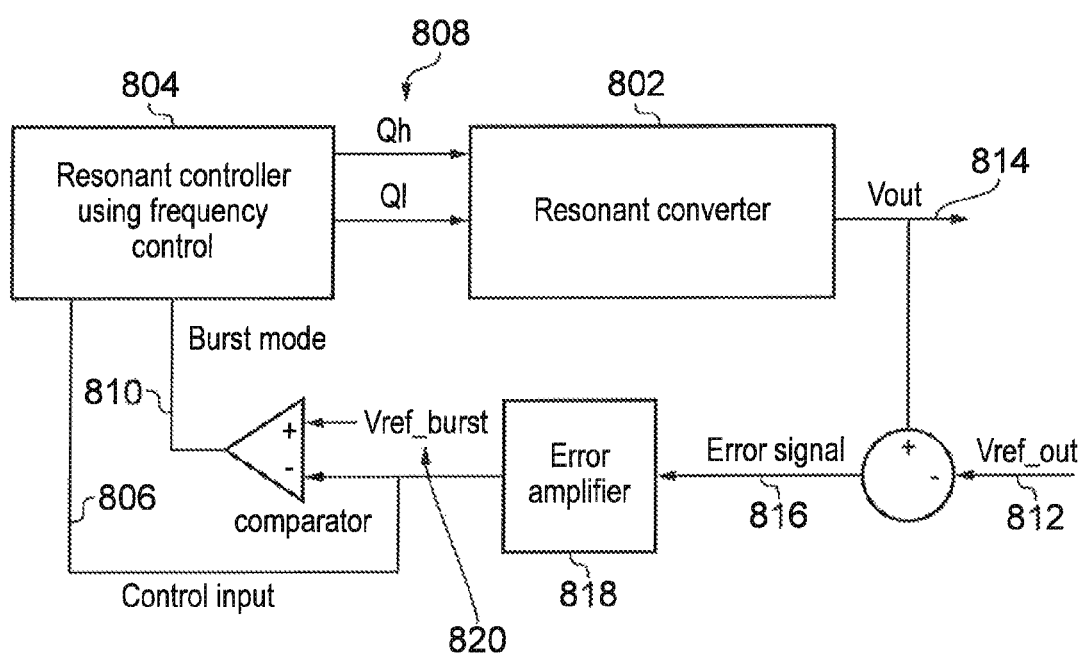
FIG. 8 illustrates schematically a prior art circuit that includes a resonant converter that can operate in a burst mode of operation.

FIG. 8 illustrates schematically a prior art circuit that includes a resonant converter 802 that can operate in a normal mode of operation and a burst mode of operation. Such a circuit is known from the ST type L6599 and NXP TEA1613 application boards.

The resonant converter block 802, which can include HB drivers, switches, resonant components, a transformer and rectifiers, is controlled by a controller block 804. The controller block 804 receives a control input signal 806, and uses the control input signal 806 to determine a frequency of drive signals 808 that are provided to the resonant converter 802 to adjust the output voltage during normal operation, and more precisely, provided to the half bridge switches of the resonant converter 802.

The resonant converter 802 also receives a burst mode input signal 810 that causes the control block 804 to disable both half bridge switches in the resonant converter 802 when the burst mode input signal 810 is high.

The circuit of FIG. 8 also includes an error loop that determines an error signal 816 that is the difference between the desired Vout (Vref_out) 812 and the actual Vout 814. As known in the art, this difference can be calculated at the secondary side of the transformer, and the error signal 816 can be passed back to the primary side of the transformer via an opto-coupler so as to maintain isolation between the primary and secondary sides of the transformer. The error loop also includes an error amplifier 818 that includes components for gain setting and compensation, and provides the control input signal 806 as an output. The polarity of the control input signal 806 is such that it turns low when Vout 814 increases above Vref_out 812. A lower control input signal 806 gives a higher frequency of operation of the resonant converter 802, thereby reducing the converted power level during normal operation.

When the output of the error amplifier 818 (which is the control input signal 806) falls below a burst threshold level Vref_burst 820 (as determined by a comparator), the controller 804 is provided with a burst mode signal 810 that causes the resonant converter 802 to be switched off completely. When the resonant converter 802 is switched off completely, a burst off interval is started. The burst off interval (that is, the pause between burst intervals) continues until Vout 814 drops below Vref_out 812, which causes the output of the error amplifier 818 (the control input signal 806) to increase above the burst threshold level Vref_burst 820. This, in turn, causes the burst mode signal 810 to change, thereby turning on the resonant converter 802 again and starting a new burst on time. It will be appreciated that the resonant controller 804 operates the resonant converter 802 with a high switching frequency for a burst on time as the control input 806 is at a low level that corresponds with about Vref_burst 820. As will be described below with reference to FIG. 10, the output power when operating under high switching frequencies is not very responsive to changes in switching frequency.

Figure 9:
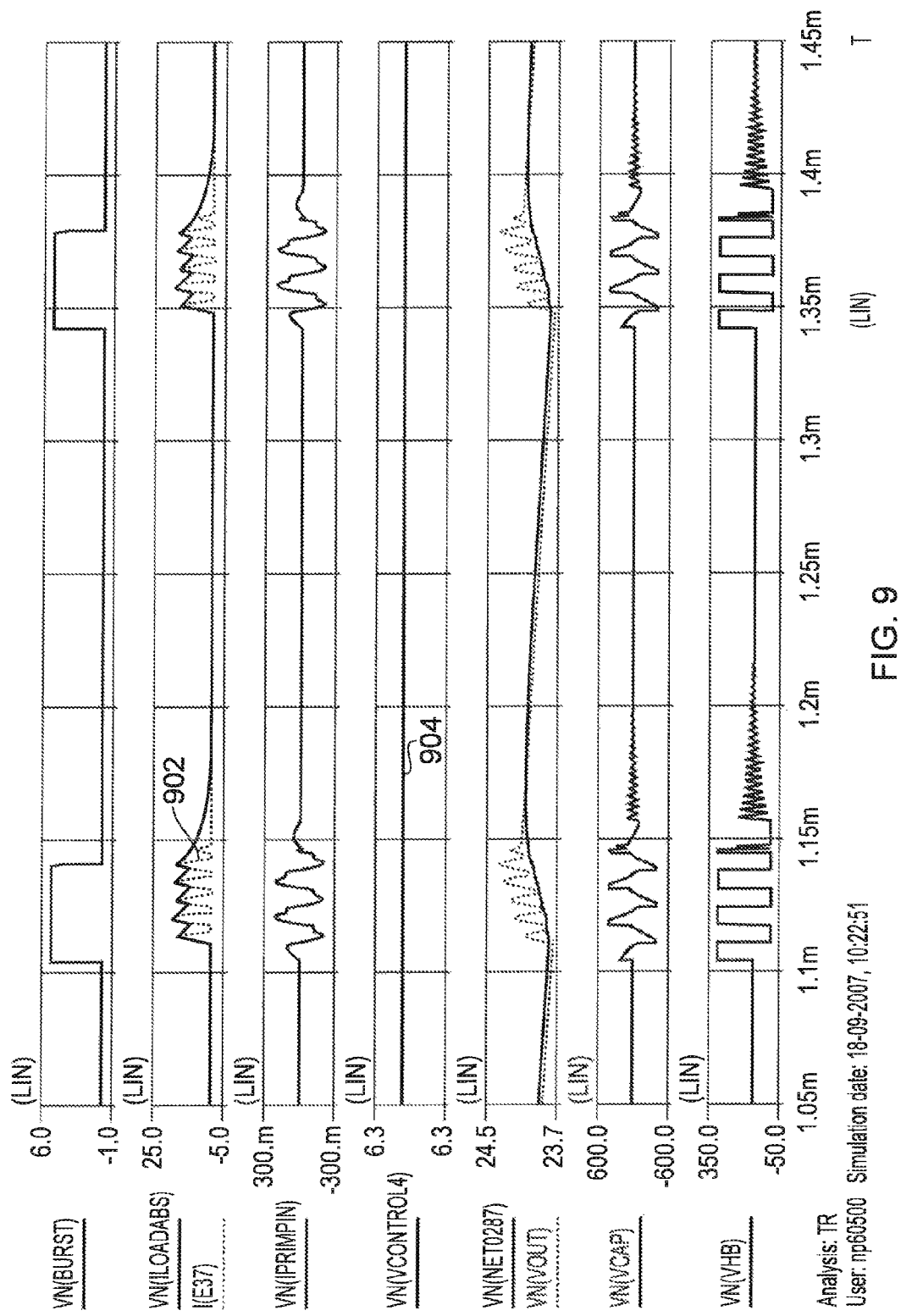
FIG. 9 illustrates a simulation result of a circuit with a burst mode having a fixed frequency.

The prior art can be considered as effectively operating at a fixed switching frequency during a burst on-time, where the fixed frequency generally corresponds with the frequency associated with the level of Vref_burst 820. The fixed switching frequency should be sufficiently accurate to define the required power level during a burst. A simulation result of a circuit with a burst mode having a fixed frequency is shown in FIG. 9. The value for Vref_burst 820 (and therefore the fixed frequency during a burst) is set using trial and error so that a desired power level is provided for the specific components that are being used. It will be appreciated that it is impractical to individually set the fixed frequency value by trial and error for each resonant converter.

In FIG. 9, I(E37) 902 is the output current. vcontrol4 904 is representative of Vref_burst, and is the control voltage for the VCO that directly defines the operating frequency during the burst. It can be seen that the value of vcontrol4 904 is constant in FIG. 9. It should be noted that the frequency of operation of the signals illustrated by the simulation results of FIG. 9 are set by trial and error so that the desired power level is achieved.

However, in a practical application, it is not possible to set the frequency this accurately as is required due to inaccuracies in component values, for example. In practice this results in a large spread in the power level during the burst. The result is therefore an extra margin for the power level set and therefore an efficiency that is lower than desired.

A disadvantage of the circuit of FIG. 8 is that the level Vref_burst 820 is coupled to a certain frequency of operation during a burst. As described below with reference to FIG. 10, the relationship between power and frequency for a resonant converter can be very steep for certain frequencies such that a small change in frequency causes a large change in power, and the relationship can be very shallow for other frequencies. A 10% tolerance in component values causes a much larger than 10% variation/tolerance in output power when the desired high power level is set. This forces a user to choose a low power level where the relationship is more shallow so that the variation/tolerances do not have as large an effect. This restriction on the power levels that can be chosen represents a disadvantage of the prior art. One or more embodiments of the invention enable the switching frequency to be adjusted during an on-time of a burst in order to improve the performance of the converter.

The spread in power due to the tolerance in component values means that it is not possible to set a proper level for the operating frequency during the burst on time in order to define a certain power level. In fact what happens is that Vref_burst is set to a level corresponding to a higher frequency such that the power delivered in steady state at that level is approx 5-10% of the maximum output power in order to account for the tolerance of component values.

The following two characteristics affect the actual power that is delivered during the burst on time:
1. a transient effect caused by the fact that the voltage across the primary side of the transformer (Vcap) is 0 at the beginning of the burst on time if there is sufficient time between the present burst and the previous burst. During steady state operation at 50% dutycycle, Vcap is in general not zero. The result is a transient effect where the first few energy conversion pulses have a significant power level, even at this higher operating frequency, and then the steady state situation is settled within a few cycles.
2. a delay between a change in the sensed output voltage 814 and the corresponding adjustment to the control voltage 806, and also a frequency depending network between the two signals. Such a frequency dependent network is known from the feedback loop with the opto-coupler around the TL431 IC, as the feedback loop includes resistors and capacitors as part of a compensation network. This leads to an inaccurately defined power level during the burst, as the control input varies during a burst on-time. A burst on-time starts when the level of the control input 806 rises above Vref_burst 820. The burst on-time then continues whilst the control input signal 806 falls back towards Vref_burst 820, and the burst ends when the level of the control input 806 falls back below the level of Vref_burst 820. Due to this variation in the control input signal 806 during a burst on-time, the power during a burst is inaccurately defined, although if the power is set at a low level during the burst on time, there is a shallow relationship between output power and the level of the control input, and therefore the power does not change much during the burst on time.

Figure 10:
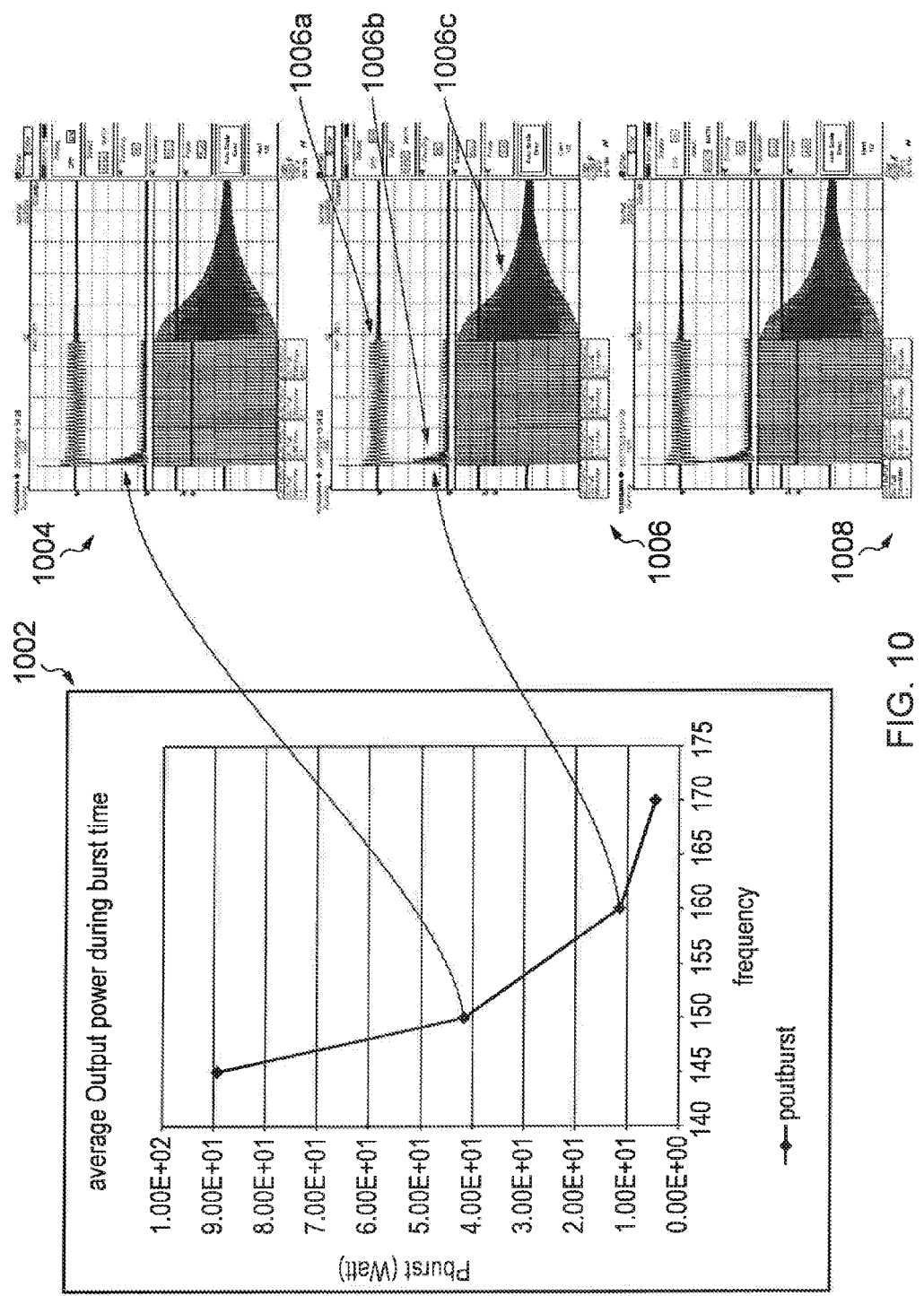
FIG. 10 illustrates graphs that show the relationship between the frequency of operation of half bridge switches and the power in a burst.
Figure 11:
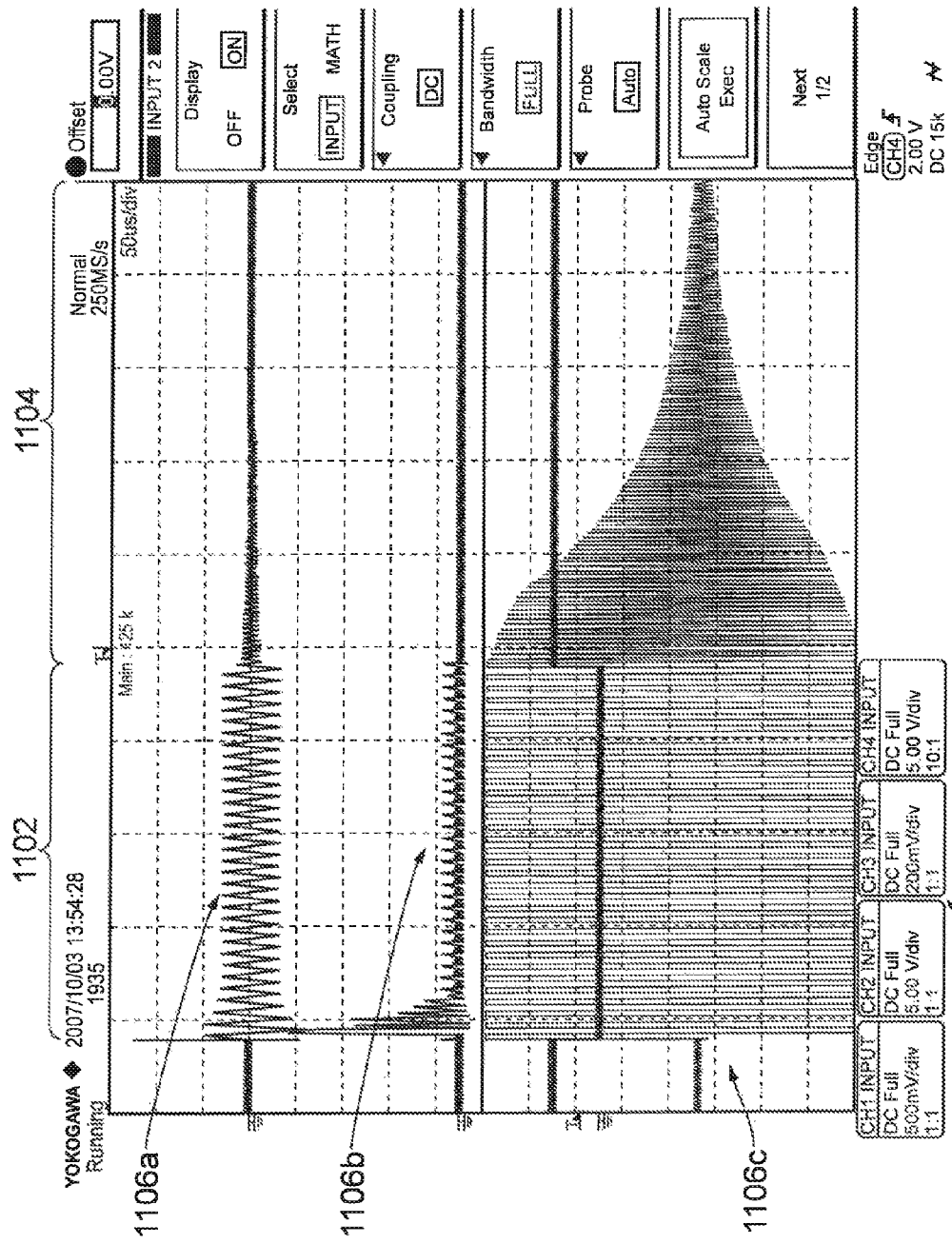
FIG. 11 illustrates further detail of a further graph from FIG. 10.

An illustration of the results of the first effect is provided as FIG. 10, with further detail being shown in FIG. 11 that represents a zoomed-in version of a portion of FIG. 10.

FIG. 10 includes a graph 1002 that shows the relationship between the frequency of operation of the HB switches (horizontal axis) and the power in a burst (vertical axis). It can be seen that for high frequencies, a change in frequency has a reduced effect on the power.

Also shown in FIG. 10 are three further graphs 1004, 1006, 1008, which each illustrate three signals: the top signal 1006a in each of the further graphs is the input current, the middle signal 1006b is the output current, and the bottom signal 1006c is the voltage at the node between the half bridge switches (VHB).

FIG. 11 illustrates more detail of the second further graph 1006. The burst on time is identified with reference 1102 in FIG. 11, and the burst off time (period between bursts) is identified with reference 1104.

It is apparent from FIGS. 10 and 11 that during most of the burst on time 1102 a significant input/primary current 1106a flows (almost exclusively magnetizing current) while almost no power is converted as evidenced by the low output current 1106b for most of the burst on time 1102.

The second effect identified above further increases the power at the beginning of the burst on time 1102 and reduces the power during the rest of the burst on time 1102. This is shown in FIG. 11 as the output current 1106b sharply drops to zero after about six switching cycles. Therefore, this prior art way of implementing a burst mode of operation of a resonant converter gives a significant compromise with regard to efficiency.

Embodiments disclosed herein enable a better output power level to be set during the burst on time.

Figure 12:
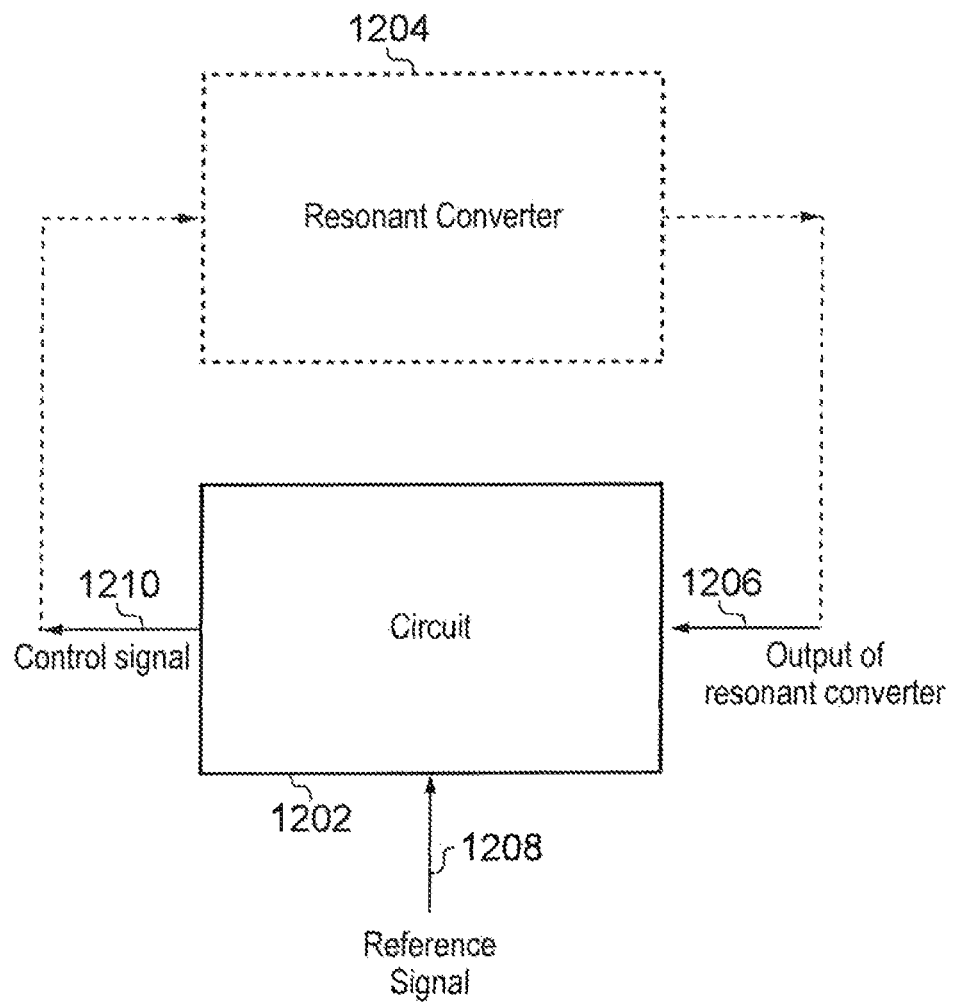
FIG. 12 illustrates schematically a circuit according to an embodiment of the invention.

FIG. 12 illustrates schematically a circuit 1202 according to an embodiment of the invention. The circuit 1202 is for a resonant converter 1204 that can operate in a burst mode of operation.

The circuit 1202 receives an input signal 1206 representative of the output of the resonant converter 1204. The signal 1206 can be representative of the output power of the resonant converter 1204, the output current or voltage of the resonant converter. The input signal 1206 representative of the output of the resonant converter 1204 can be obtained directly, or indirectly, from the output of the resonant converter.

The circuit 1202 also receives a reference signal 1208 indicative of the desired output of the resonant converter 1204. The circuit 1202 compares the received signal representative of the output of the resonant converter 1206 with the reference signal 1208 in order to determine an error signal.

The circuit generates a control signal 1210 in accordance with the error signal, and the control signal 1210 is provided to the resonant converter 1204 to set the frequency of a burst mode of operation of the resonant converter 1204. The frequency of the burst mode of operation is set such that the output power of the resonant converter 1204 is controlled accordingly.

It will be appreciated that the functionality of the circuit 1202 described above could be implemented in many different ways whilst still providing the required functionality. Various implementations are described below, although it will be appreciated that embodiments of the invention should not necessarily be considered as restricted to specific component layouts, where alternative components for performing the same functionality are well known to the person skilled in the art.

In some embodiments, the signal 1206 representative of the output of the resonant converter 1204 could be derived from signals at the primary side of a transformer of the resonant converter, as the relationship between signals at the primary side of the transformer and the output of the converter can be known. In some examples, an error signal representative of the difference between the actual output and a reference output can be used as the input signal 1206 representative of the output of the resonant converter 1204.

Figure 13:
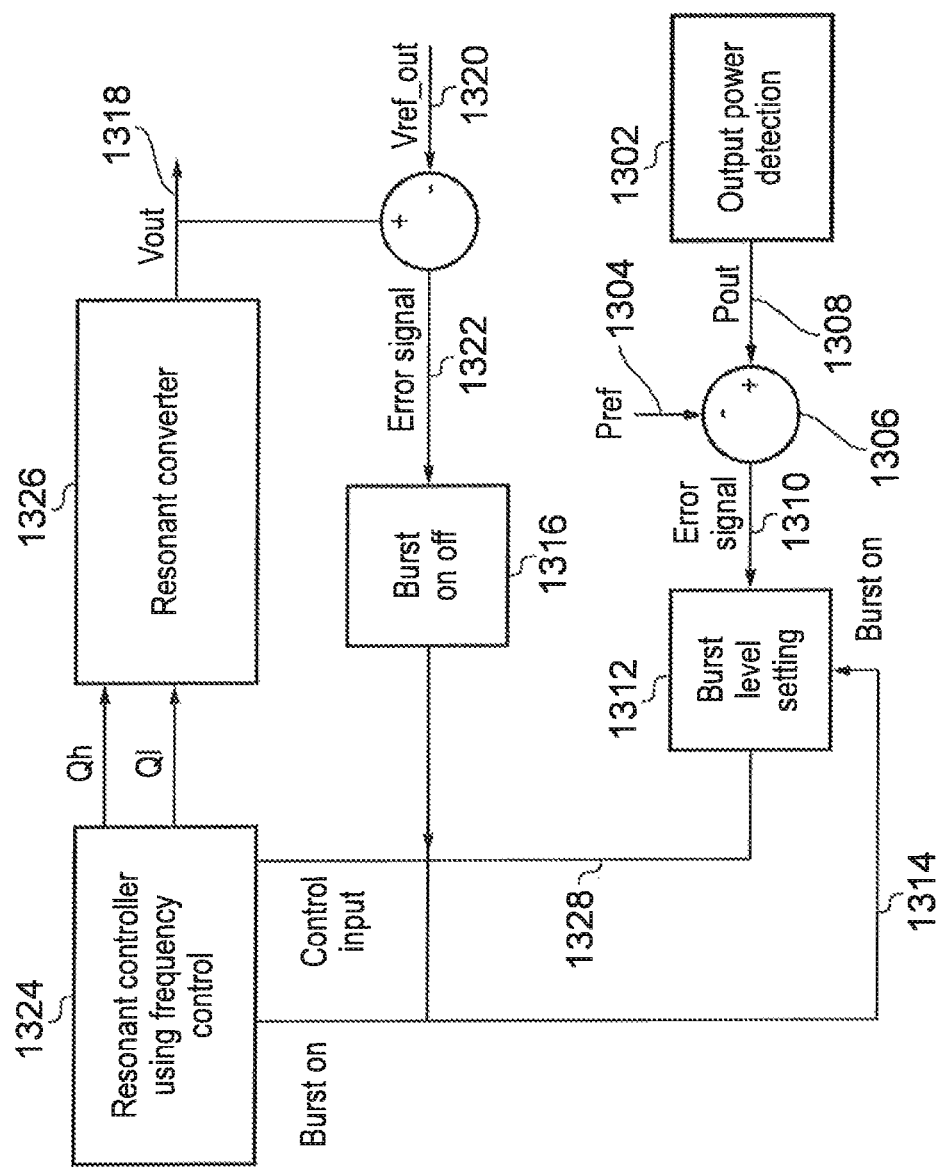
FIG. 13 illustrates schematically a circuit according to a further embodiment of the invention.

A further embodiment of the invention is illustrated as FIG. 13. In this embodiment, the converted output power is measured directly or indirectly by an "output power detection" block 1302, and the circuit is configured to adapt the operating frequency during the burst on time (if such adaptation is required) in order to regulate the output power to a desired level during the burst on time.

The output power detection block 1302 can be implemented in any known way in order to provide a power out signal 1308 (Pout). For example, the output power can be detected by measuring the primary current, reconstructing the output current by subtracting an emulated magnetizing current from the measured primary current (as disclosed in WO2010/020909), or taking the average value of the primary current during the conduction interval of one of the half bridge switches.

In contrast to the prior art, the circuit of FIG. 13 adaptively regulates the output power to a desired power level during a burst on-time, and the desired power level is provided to the circuit as Pref signal 1304.

The circuit of FIG. 13 includes a summation component 1306 that subtracts the desired power level signal 1304 (Pref) from the power out signal 1308 (Pout) in order to provide an error signal 1310. The error signal 1310 is provided as an input to a "burst level setting" block 1312. Also provided as an input to the burst level setting block 1312 is a "mode of operation" signal, which is also called a "burst on" signal 1314. The output of the burst level setting block 1312 is a control signal 1328 for the controller 1324 of the resonant converter 1326.

The "burst on" signal is provided by a "burst on or off" block 1316 that processes a signal representative of the difference between the output voltage 1318 and a desired output voltage 1320. This difference between the output voltage 1318 and the desired output voltage 1320 is represented by a second error signal 1322.

As well as providing the "burst on" signal 1314 to the "burst level setting" block 1312, the "burst on or off" block 1316 also provides the "burst on" signal 1314 to the controller 1324 for the resonant converter 1326. In a similar way to that discussed above, the controller 1324 can use the "burst on" signal 1314 to turn off both half bridge switches in order to provide a burst off time (that is, a pause between bursts).

In this embodiment, the regulation of the output power can take place over more than one burst cycle, and in one example the last value of the operating frequency of a previous burst on time can be used as the starting value at the beginning of the next burst on time. For example, the burst level setting block 1312 may not change the value of the control input signal 1328 when the "burst on" signal is representative of a burst off time.

In some embodiments, a sample and hold component can be used to store information from a previous burst. This is one way in which the frequency for a next burst can be determined using measured parameters (such as power level or current level, for example) from a previous burst.

One implementation for storing the last frequency value used during a previous burst cycle is to use a capacitor in the "burst level setting" block 1312 as a memory component. The capacitor is charged or discharged by the error signal 1310 during the burst on time. Then, during the burst off time, the capacitor is disconnected from the error signal so that it maintains the same voltage that was determined at the end of the previous burst on time.

The capacitor can be driven by a switch that is connected to the error signal 1310 and controlled by the burst on signal 1314, and this can be considered as an implementation of a track and hold component. If the on-resistance of the switch is made high, then this provides an implementation of a filter that includes the history of several burst on intervals.

Therefore, the burst level setting block 1312 can provide a control signal 1328 for a next burst cycle using an error signal 1310 that starts with the last value determined from the previous burst cycle. The control signal 1328 can represent the average frequency that is required to provide the desired output This is in contrast to the prior art where the control signal is calculated from an inaccurate error signal that has been changing during the burst off time.

In some examples, the control signal can be calculated using an algorithm that processes the control signal or error signal from one or more previous bursts. An example algorithm is to average the control signal or error signal from n earlier bursts, where n can be any positive number, although the skilled person will appreciate that other algorithms are possible. Such an algorithm can be implemented using a filter to smoothly adapt the control signal, and therefore smoothly adapt the switching frequency of the resonant converter. In this way, a more sophisticated implementation for accurately calculating the control input signal 1328 can be provided.

Embodiments disclosed herein can be considered as disabling or opening a feedback loop between bursts so that a control signal is not affected by signals that occur during a burst off time.

Figure 14:
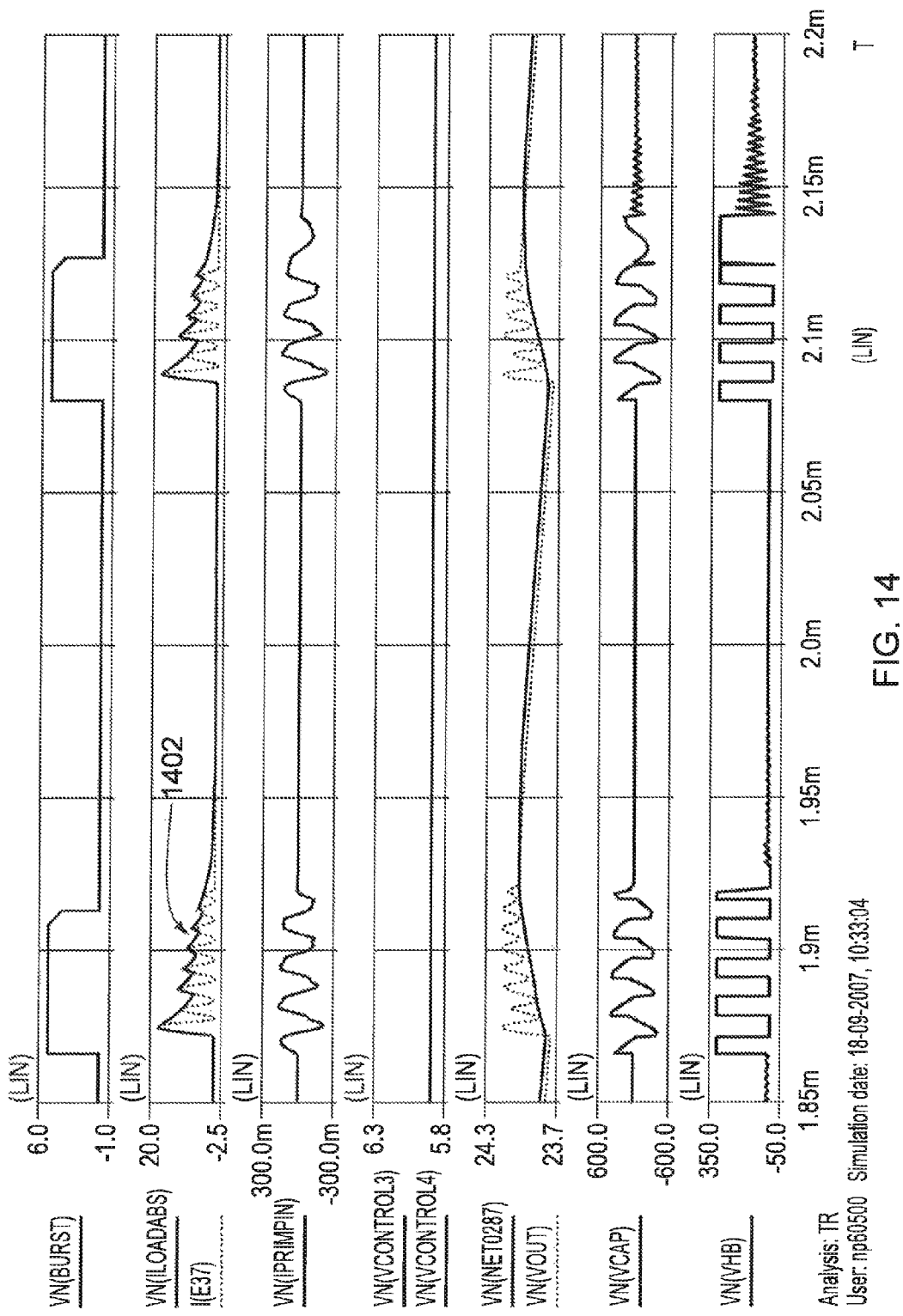
FIG. 14 illustrates simulation results of the circuit of FIG. 13.
Figure 19:
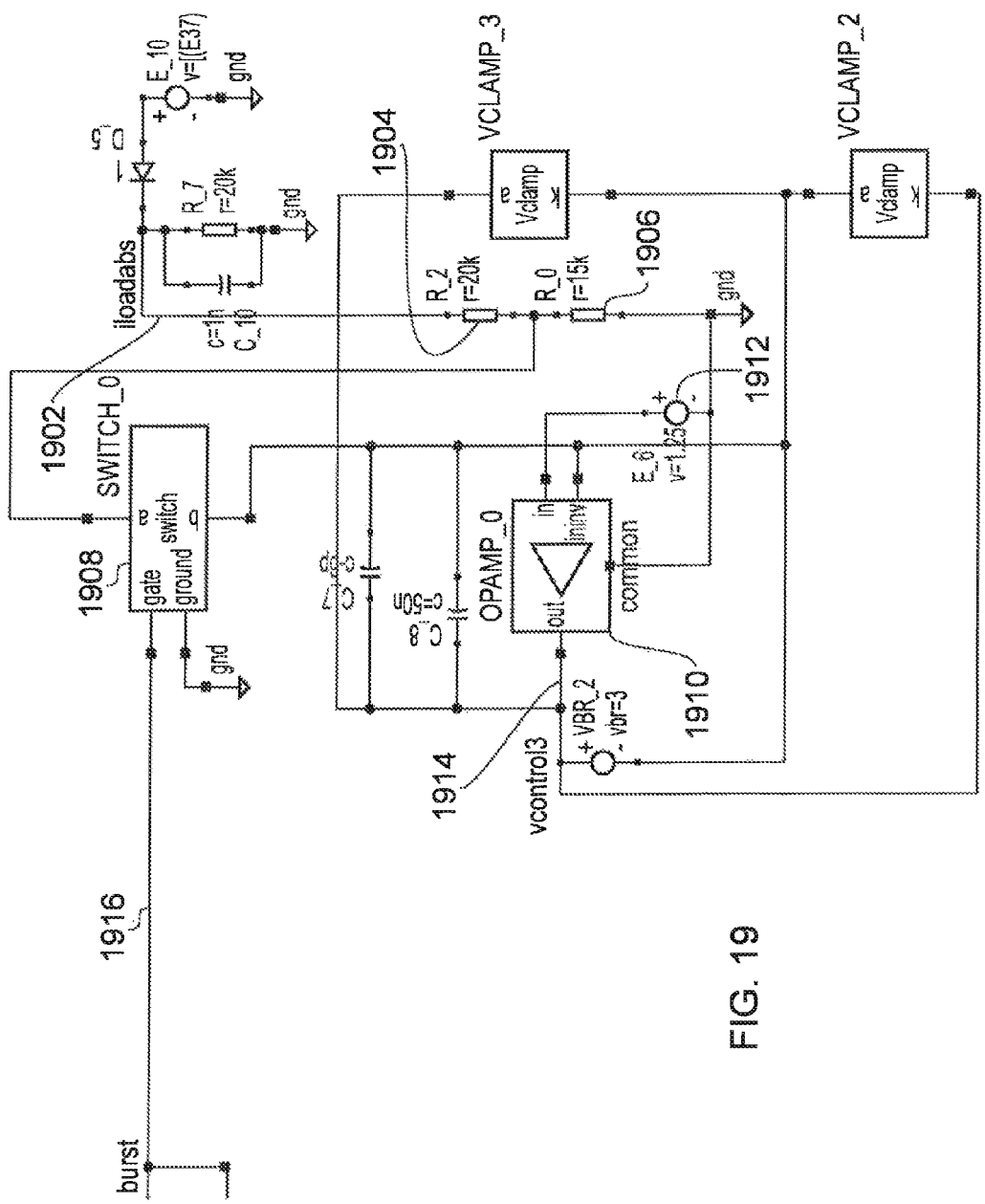

FIG. 14 illustrates simulation results of the circuit of FIG. 13, whereby the last value for the control signal is carried over from a previous burst. FIG. 14 represents a simulation of a circuit that uses an "output power detection and burst level setting" module that includes an integrator for integrating the error signal in the current domain only during the burst on-time. During the burst off interval the error current is disconnected from the integrator, which causes the integrator to hold the last state of the control signal. An example of such an "output power detection and burst level setting" module is illustrated in FIG. 19, and described below.

The simulation results illustrate, amongst other things, that the current 1402 at the output drops-off less dramatically at the start of a burst cycle than the prior art waveforms that are illustrated in FIGS. 10 and 11. Therefore, the circuit of FIG. 13 improves the efficiency when compared with the prior art. However, it can be seen that the current 1402 at the output still has a significant peak at the start of a burst, and small drop-off at the very end of a burst. This will be called a transient effect. A more constant output current value would improve efficiency further.

Figure 15:
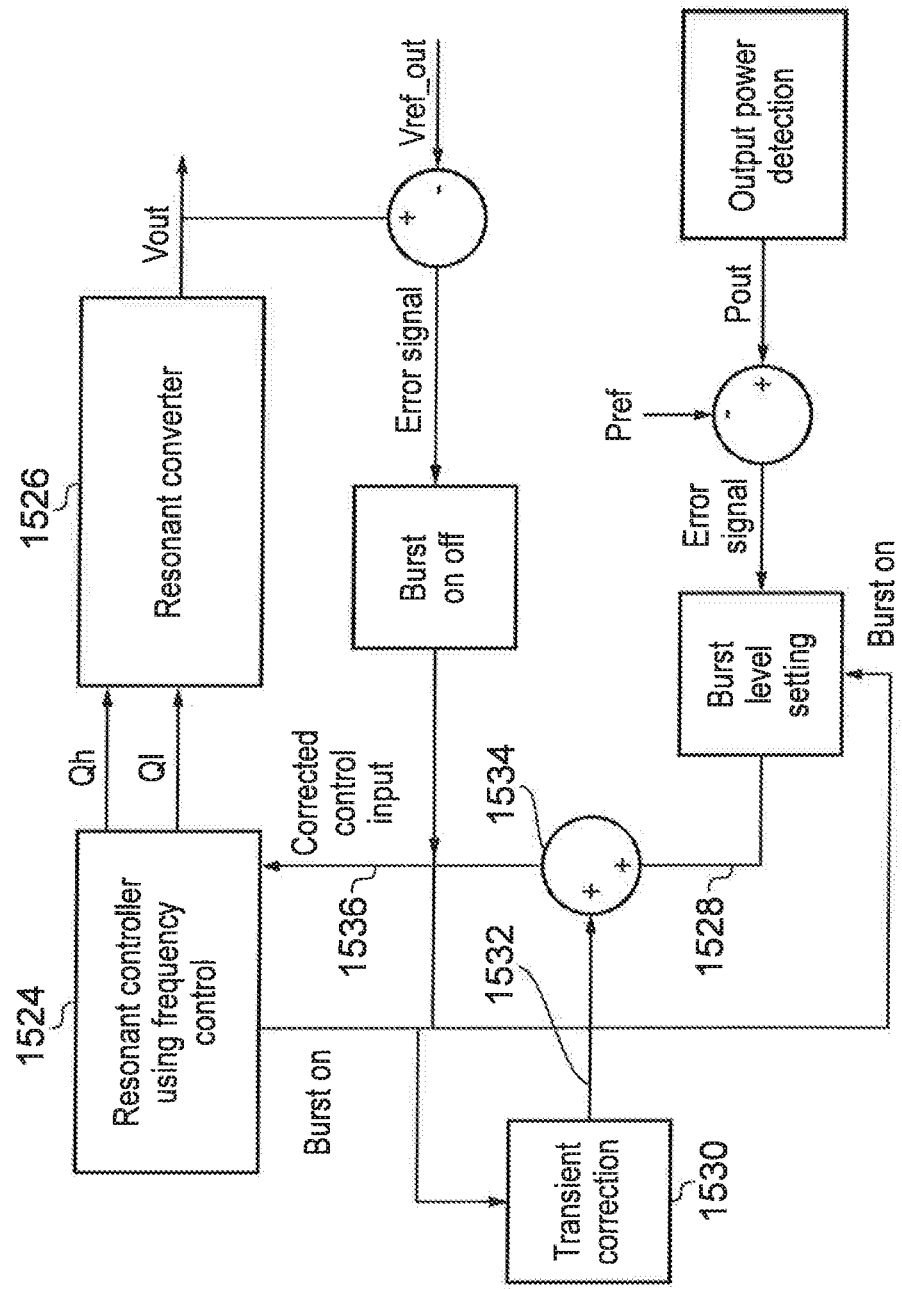
FIG. 15 illustrates schematically a circuit according to a further embodiment of the invention.

An additional embodiment of the invention is illustrated as FIG. 15. Features of FIG. 15 that are common to FIG. 13 will not be described again here. The circuit of FIG. 15 includes a "transient correction" block 1530. The transient correction block 1530 provides a correction signal 1532 to a summing component that adds the correction signal 1532 to the control signal 1528 that is output by the burst level setting block 1512. The output of the summation component 1534 is a corrected control signal 1536 that is provided to the controller 1524 of the resonant converter 1526. Using the correction signal 1532 provides compensation for the transient effect at the beginning and/or end of a burst on time, and adjusts the frequency of operation of the resonant converter at the start and/or end of a burst in order to adjust the frequency accordingly. This operation is described further with reference to the simulation results of FIG. 16.

Figure 16:
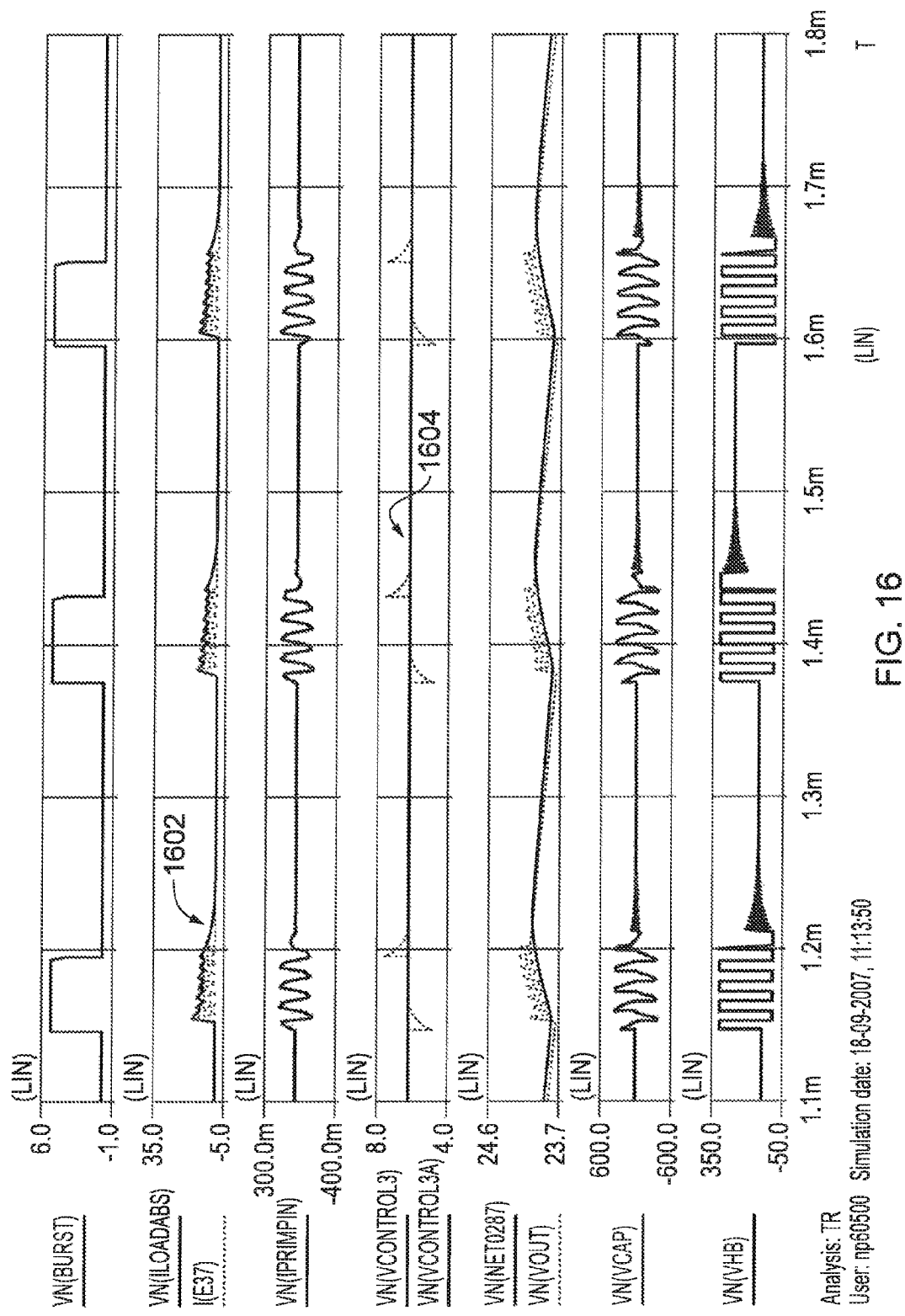
FIG. 16 illustrates simulation results of the circuit of FIG. 15.

The simulation results of FIG. 16 illustrate the corrected control signal with reference 1604. It can be seen that instead of being constant, the corrected control signal 1604 varies as a function of time and includes a negative peak at the start of a burst and a positive peak at the end of a burst. The peaks in the corrected control signal 1604 may be a step function followed immediately by a gradual change back to the average (uncorrected) value of the control signal. The gradual change in this example is an exponential change back to the average value. The transient correction signal 1532 consists of the two peaks which gradually rise/fall to zero during the burst. It will be appreciated that when the transient correction signal 1532 is zero, the corrected control signal 1604 takes the value of the uncorrected control signal.

In this embodiment, the transient correction signal 1532 is determined by differentiating the burst on signal with a non-ideal differentiator, and then the transient control signal is added to the initial control signal 1528 representative of the average (uncorrected) frequency to provide the corrected control signal 1604 illustrated in FIG. 16.

It can be seen from the output current 1602 in FIG. 16 that a more consistent signal is provided during the burst, and therefore the efficiency of the circuit is improved further. This is because the negative peak in the corrected control signal 1604 reduces the overshoot in the output current at the start of a burst, and the positive peak in the corrected control signal 1604 reduces the drop-off in the output current at the end of a burst.

The implementation of the transient correction signal is not limited to a differentiating action only, and can have any time dependant behaviour (which may be fixed or adaptively set) that adjusts the converted power during the burst, and in some embodiments makes the converted output power as constant as possible. In some embodiments, the transient correction signal 1532 can be a dynamically adjustable function of time, as opposed to a fixed function of time. For example, the slope or magnitude of the transient correction signal 1532 could be adaptable to adjust the output of the resonant converter in a desired way, for example to make the output power more consistent during a burst. In one embodiment, the slope and or magnitude of the peak of the transient correction signal 1532 can be adjusted in accordance with feedback representative of the output of the resonant converter.

According to further still examples, it is possible to split up the burst on-time into segments, and adapt the segments of the transient correction signal separately. The converted power level can then be slowly adapted (over several burst cycles) by comparing the delivered power with the desired power in order to adapt the control input during specific segments of the burst on-time.

Figure 17:
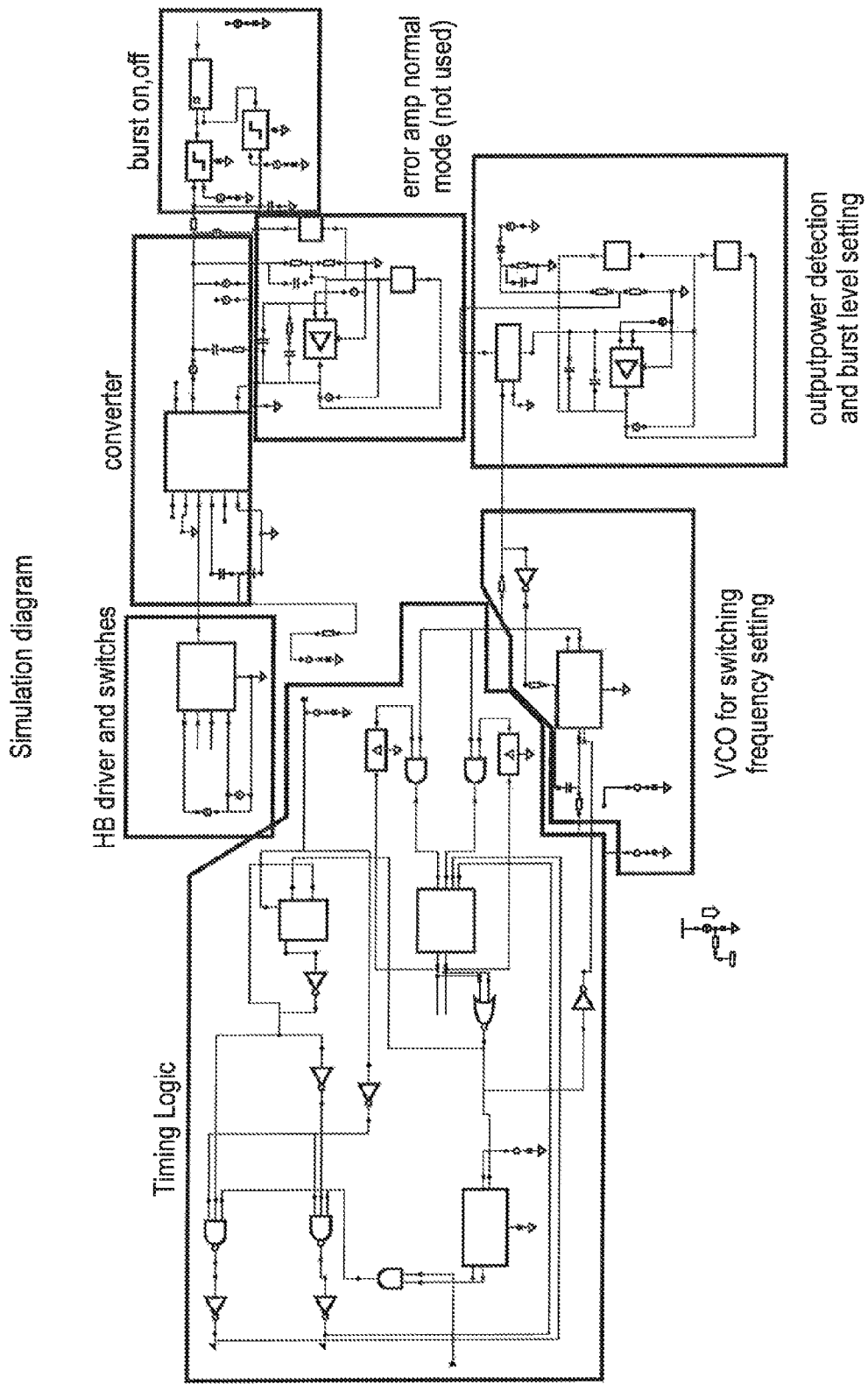
FIG. 17 illustrates a simulation model that corresponds to the schematic diagram of FIG. 15.

FIG. 17 illustrates a simulation model that corresponds to the schematic diagram of FIG. 15.

Figure 18:
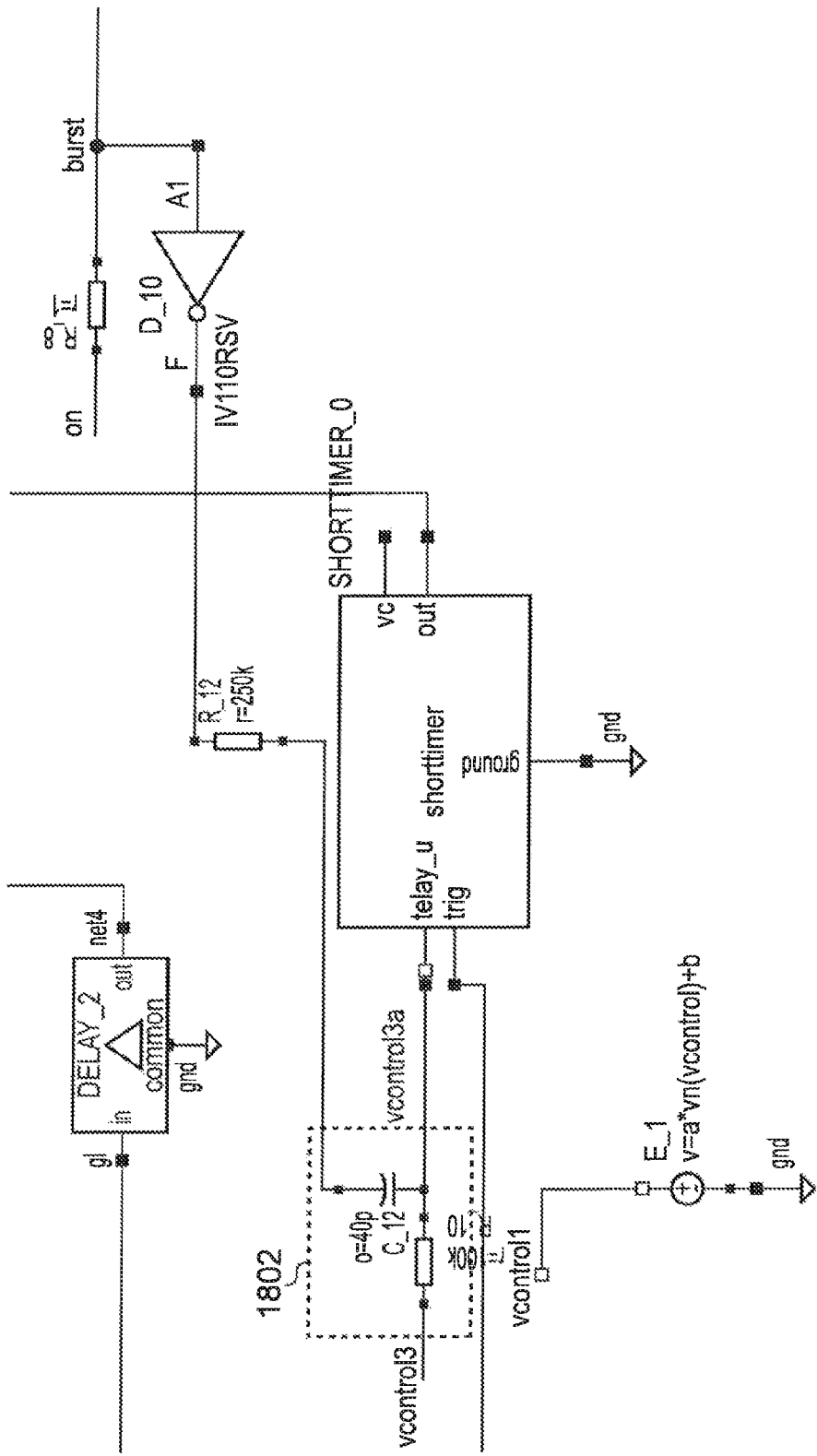
FIGS. 18 and 19 illustrate details of a simulation model used to provide the simulation results of FIG. 16.

FIG. 18 illustrates further details of the simulation model of FIG. 17, and includes a capacitor and a resistor that represents one implementation of a differentiator 1802 that can provide the transient correction signal for controlling the resonant converter.

FIG. 19 illustrates further details of the "output power detection and burst level setting" module of FIG. 17. The signal Iload_abs 1902 is used as representation of the output power (1308 in FIG. 13). The signal Iload_abs 1902 is divided by resistors R2 1904 and R0 1906 and fed to a switch (switch_0) 1908. The output of the switch 1908 is connected to the minus input of an integrator 1910 based on an opamp. The minus input therefore acts as a virtual ground with a DC level of 1.25V (by E6 1912 at the plus input of the opamp) that integrates the current flowing into the minus input. The output 1914 of the opamp (vcontrol 3) corresponds to the frequency control input of the resonant converter that is illustrated in FIG. 13 with reference 1328, while the functionality of the burst level setting block 1312 of FIG. 13 is realized by the integrator function around the opamp 1910 of FIG. 19. As the minus input of the opamp is current driven, it is easy to maintain the final value of the previous burst power (which corresponds to the frequency signal 1328) by turning off switch_0 1908 (signal 'burst' 1916 turning low) as the time constant of the integrator 1914 is long (R2*(C7+C9), which equals 1 msec in this example, although other values are possible). In fact, the power level during the burst on-time is slowly adapted over more than one burst period, however by switching off switch_0 1908, the last value of the integrator 1914 is immediately maintained, as the current for integrating that is provided by the switch_0 1908 is immediately 0.

Embodiments of the invention can be used with other types of resonant converters.

In some embodiments the circuit can include a feedback loop that is used to control the frequency of operation of a resonant converter, and the circuit can have an enable function closes the loop during the burst and opens the loop between bursts (that is, during burst off times). In this way a value for the feedback signal at the end of a burst can be used as a starting value for the next burst. An additional signal (such as a transient correction signal) can be added to the feedback signal to influence the output power of the resonant converter as a function of time during a burst.

The invention claimed is:

1. A circuit for a resonant converter, the resonant converter configured to operate in a burst mode of operation, the circuit configured to:
   receive a signal representative of the output of the resonant converter;
   compare the received signal representative of the output of the resonant converter with a reference signal in order to provide an error signal; and
   process the error signal in order to provide a control signal, wherein the control signal is configured to set the switching frequency of the resonant converter in order to control the output power during the on-time of a burst of the resonant converter.

2. The circuit of claim 1, wherein the control signal is configured to adjust the switching frequency during a burst.

3. The circuit of claim 1, wherein the signal representative of the output of the resonant converter is representative of the output power or output current of the resonant converter.

4. The circuit of claim 1, wherein the circuit is configured to process error signals relating to one or more earlier bursts of the resonant converter in order to provide the control signal.

5. The circuit of claim 4, wherein the circuit is configured to process error signals that relate to bursts of the resonant converter, and not process error signals that relate to "burst off" times of the resonant converter, in order to provide the control signal.

6. The circuit of claim 4, wherein the circuit is configured to process a value for the control signal or error signal from a previous burst in order to provide a control signal for a current burst.

7. The circuit of claim 6, comprising a memory component configured to store the last value for the control signal or error signal from a previous burst for use in providing a starting value of the control signal for a current burst.

8. The circuit of claim 1, further comprising:
   a transient correction component configured to provide a transient correction signal that is configured to reduce any transient effects in the output power of the resonant converter during a burst; and
   a summation component that is configured to add the transient correction signal to the control signal in order to provide a corrected control signal for setting the switching frequency of the resonant converter.

9. The circuit of claim 8, wherein the transient correction signal comprises a negative peak at the start of a burst and/or a positive peak at the end of a burst in order to reduce an excess in output power at the start of a burst and/or reduce a deficiency in output power at the end of a burst.

10. The circuit of claim 9, wherein the transient correction signal is configured to change value from the negative and/or positive peak towards zero during the burst.

11. The circuit of claim 8, wherein the transient correction signal is a function of time that is fixed in relation to a burst cycle.

12. The circuit of claim 8, wherein the transient correction signal is a dynamically adjustable function of time, such that feedback representative of the output of the resonant converter is usable by the circuit to determine and apply the transient correction signal.

13. The circuit of claim 1, wherein the circuit comprises a burst level setting component that is configured to receive the error signal and a "mode of operation" signal, and provide the control signal only when the "mode of operation" signal is representative of a burst mode of operation.

14. The circuit of claim 13, wherein the burst level setting component is configured to open a feedback loop at times between bursts so that the control signal is only updated with error signals received during a burst.

15. A method of providing a control signal for a resonant converter, the resonant converter configured to operate in a burst mode of operation, the method comprising:
   receiving a signal representative of the output of the resonant converter:
   comparing the received signal representative of the output of the resonant converter with a reference signal in order to provide an error signal; and
   processing the error signal in order to provide the control signal, wherein the control signal is configured to set the switching frequency of the resonant converter in order to control the output power during the on-time of a burst of the resonant converter.

* * * * *